Sept. 6, 1966 R. L. RIDDLE 3,271,650
SYSTEM FOR MAINTAINING AN OBJECT IN A PREDETERMINED
REFERENCE PLANE
Filed Sept. 24, 1963
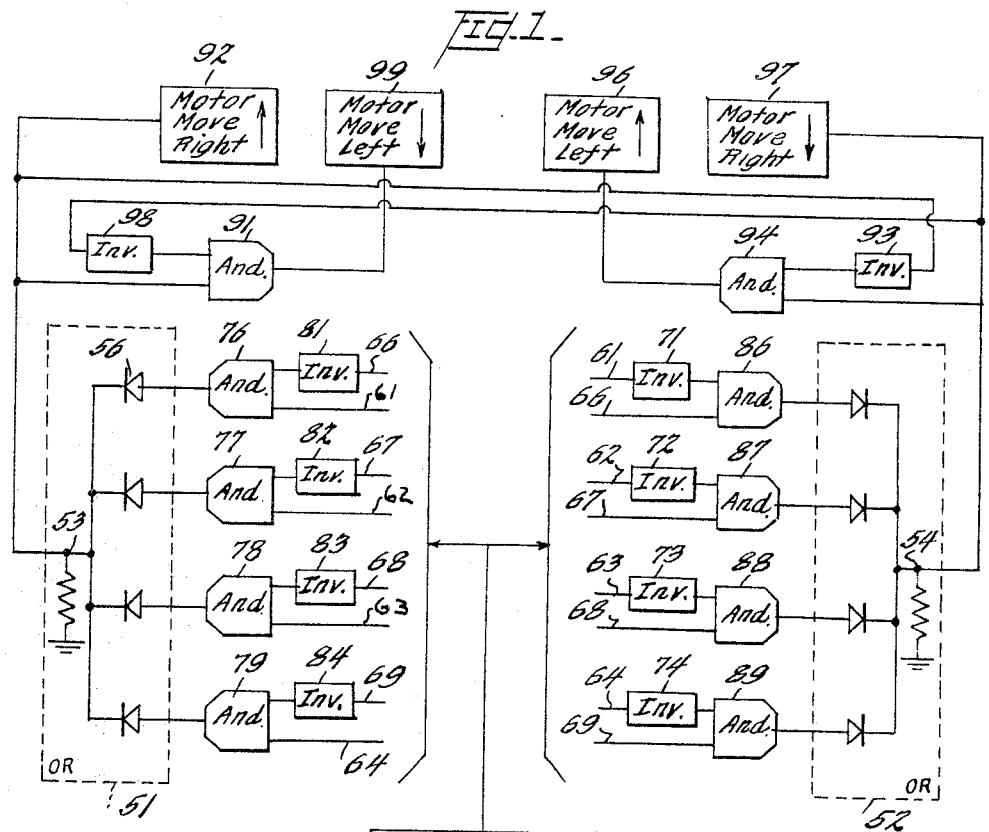
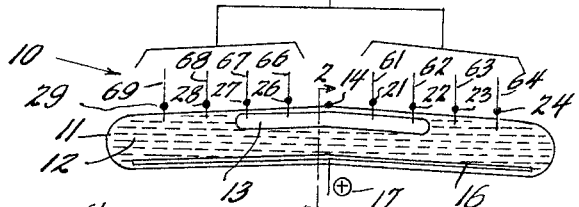
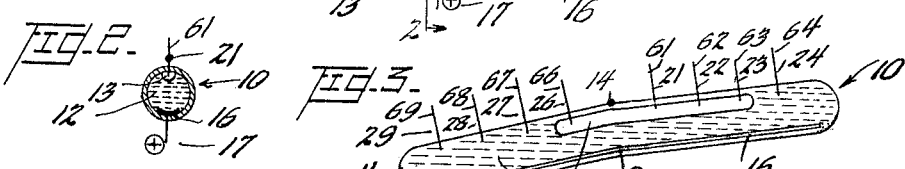
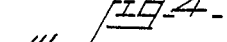
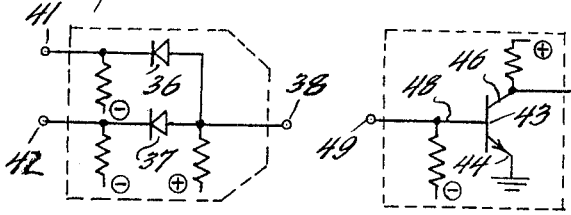
INVENTOR
Richard L. Riddle,
BY
W. M. Kain
ATTORNEY

United States Patent Office 3,271,650
Patented Sept. 6, 1966

3,271,650
SYSTEM FOR MAINTAINING AN OBJECT IN A PREDETERMINED REFERENCE PLANE
Richard L. Riddle, El Paso, Tex., assignor to Western Electric Company, Incorporated, New York, N.Y., a corporation of New York
Filed Sept. 24, 1963, Ser. No. 311,251
3 Claims. (Cl. 318—489)

This invention relates to a system for maintaining an object in a predetermined reference plane and more particularly to a leveling system of general utility having facilities for sensing deviations of an object from a predetermined reference plane and for restoring the object to the predetermined reference plane.

The desire to maintain an object in a predetermined reference plane arises in many situations. For example, it may be desirable to maintain a radar antenna support platform in a horizontal level plane. Prior art systems for maintaining a radar antenna platform in a level plane have been complicated and expensive. One such prior art system utilizes a sensing unit associated with the platform in such a manner that there is no voltage output from the sensing unit when the platform is level. If the platform deviates from the level position, the sensing unit produces an analog output voltage which is proportional to the amount of deviation of the platform from the level position. This analog output voltage is impressed upon control circuitry to energize a servo-motor system to level the platform.

As used throughout the remainder of the specification, the term "level plane" is to be construed broadly and includes not only horizontal planes, but any other desired predetermined reference plane such as vertical, oblique, or the like. The term "leveling" is also to be construed broadly and includes all cases of orientation relative to a predetermined reference plane, whether horizontal or other.

An object of this invention is to provide a new and improved system for maintaining an object in a predetermined reference plane.

Another object is to provide a new and improved leveling system of general utility having facilities for sensing deviations of an object from a predetermined reference plane and restoring the object to the predetermined reference plane.

Another object is to provide a system for leveling objects which is simpler in operation and more economical to build than prior art leveling systems.

A related object is to provide in a leveling system a new and improved level sensor unit for detecting whether an object deviates from a predetermined reference plane.

Another related object is to provide in a leveling system a level sensor unit having a binary form output indicative of the orientation of an object with respect to a predetermined reference plane.

With these and other objects in view, a system for leveling objects illustrating certain features of the invention may include a level sensor unit having a binary form output for detecting whether an object deviates from a level plane and facilities which are responsive to the binary form output for restoring the object to the level plane. More particularly, voltages are developed in binary form at a plurality of output electrodes of the level sensor unit. These binary voltages represent the orientation of the object with respect to a level plane passing through the object and are impressed on gating circuits to energize a motor system for returning the object to the level plane.

Other objects and advantages of the invention will become apparent from a consideration of the detailed specification and the accompanying drawings, wherein:

FIG. 1 is a block diagram of a system for leveling objects embodying the principles of the invention, and shows a level sensor unit; a gating network which includes AND circuits, OR circuits, and INVERTER circuits; and a motor system;

FIG. 2 is a cross section view taken along the line 2—2 of FIG. 1 and shows a cross section of the level sensor unit;

FIG. 3 is a view showing the level sensor unit of FIG. 1 tilted from a horizontal plane;

FIG. 4 is a schematic diagram of one of the AND circuits shown in FIG. 1; and

FIG. 5 is a schematic diagram of one of the INVERTER circuits shown in FIG. 1.

In FIGS. 1 and 2, there is shown a level sensor unit 10 which includes an hermetically sealed body portion in the general configuration of a bent tube 11 made of a nonconductive material such as glass, plastic, or the like. Tube 11 is slightly bent to provide a raised center point 14 and slopes symmetrically downward about a vertical axis passing through the center point.

Tube 11 is almost filled with an electrolyte 12 such as copper sulphate or the like, leaving a bubble 13 contained within the electrolyte and tube. Bubble 13 may be any nonconductive or low conductivity fluid such as an air bubble, oil bubble, or the like which has a specific gravity less than that of electrolyte 12.

A bias electrode 16 extends along the length of the bottom of the inside of tube 11 to contact electrolyte 12 and is connected to a source of positive potential 17. A plurality of output electrodes 21–24 and 26–29 are symmetrically spaced in a line on either side of center point 14 along the top of tube 11. More particularly, output electrodes 21 and 26 are equidistant from center point 14 as are output electrodes 22 and 27, and so on. The output electrodes project through the walls of tube 11 and are in intimate contact with either electrolyte 12 or bubble 13.

Level sensor unit 10 is shown as having eight output electrodes 21–24 and 26–29. It is to be understood that the number of output electrodes, the distance between the output electrodes, the size of the tube, the size of the bubble, the electrolyte used, and the degree of bend of the tube can be varied depending upon accuracy requirements.

It will be apparent to one skilled in this art that tube 11 could be inverted and slope upward. Such a tube 11 would then have an electrolyte of relatively low specific gravity and a bubble of a somewhat greater specific gravity. It will also be apparent that tube 11 could be generally curved or arced symmetrically about a high point instead of sloping as shown in FIG. 1.

Level sensor unit 10 is mounted on the object which is to be maintained in a predetermined reference plane, for example on the platform of a radar antenna which is to be maintained in a horizontal plane such that the level sensor unit is level in a horizontal plane passing through the platform. In FIG. 1, level sensor unit 10 is level and bubble 13 is symmetrically positioned about center point 14.

Voltages are developed at output electrodes 21–24 and 26–29 in binary form, that is, one of two possible voltage conditions exist at the output electrodes. For example, as shown in FIG. 1, a positive voltage is developed at output electrodes 23, 24, 28 and 29 and no voltage is developed at output electrodes 21, 22, 26, and 27. A positive voltage condition is alternatively referred to as "1" and no voltage, ground, or a negative voltage condition is referred to as "0."

Referring to FIG. 3, lever sensor unit 10 is shown in a position tilted from the level plane such that bubble 13 is positioned between bias electrode 16 and output electrodes 21, 22, 23, and 26. With bubble 13 so positioned, a "1" condition is developed at output electrodes 24, 27, 28, and 29 and a "0" condition is developed at output electrodes 21, 22 23, and 26.

Referring to FIG. 4, an AND circuit, alternatively called an AND gate, includes a pair of diodes 36 and 37 having their anodes connected in parallel to an output terminal 38 and through a resistor to a source of positive bias potential. Each cathode of each diode 36 and 37 is connected in parallel to an input terminal 41 and 42, respectively, and through a resistor to a source of negative bias potential. In this manner, diodes 36 and 37 are normally biased in the conducting direction so that a negative voltage or "0" condition is developed at output terminal 38.

In the operation of the AND circuit, a "1" condition is developed at output terminal 38 when a "1" condition is simultaneously applied to each input terminal 41 and 42. If a "1" condition is applied to only one, or to neither of input terminals 41 or 42, a "0" condition is developed at output terminal 38.

Referring to FIG. 5, an INVERTER circuit, alternatively called an INVERTER gate, includes an NPN transistor 43 including an emitter 44 connected to ground, a collector 46 connected in parallel to an output terminal 47 and through a resistor to a source of positive bias potential, and a base 48 connected in parallel to an input terminal 49 and through a resistor to a source of negative bias potential.

Under the bias condition shown in FIG. 5 transistor 43 is normally biased in the nonconducting direction so that a "1" condition is developed at output terminal 47. When a "1" condition is applied to input terminal 49, transistor 43 is biased in the conducting direction so that ground potential or a "0" condition is developed at output terminal 47. In this manner, the INVERTER circuit develops at "1" output for a "0" input and a "0" output for a "1" input.

In FIG. 1, an OR circuit 51, alternatively called OR gate, includes a plurality of diodes which have their cathodes connected in parallel to an output terminal 53 and through a resistor to ground. The anode of each diode is connected to an input terminal. A second OR circuit 52 is identical to OR circuit 51 and has an output terminal 54.

In the operation of OR circuit 51, a "1" condition is developed at output terminal 53 when a "1" condition is applied to the anode of any diode of OR circuit 51. For example, if a "1" condition is applied to the anode of diode 56, the diode is biased in the conducting direction and a "1" condition is developed at output terminal 53. If any condition other than "1" is applied to all of the input terminals of OR circuit 51, a "0" condition exists at output terminal 53.

Referring to FIG. 1, output terminals 21–24 are connected in parallel over leads 61–64 to INVERTER circuits 71–74 (one of which is schematically shown in FIG. 5) and to AND circuits 76–79 (one of which is schematically shown in FIG. 4), respectively. Output terminals 26–29 are connected in parallel over leads 66–69 to INVERTER circuits 81–84, and to AND circuits 86–89, respectively. For purposes of clarity, leads 61–64 and 66–69 are shown disconnected at level sensor unit 10 and at the INVERTER and AND circuits.

Each INVERTER circuit 71–74 and 81–84 has its output terminal connected to one input terminal of an AND circuit 86–89 and 76–79, respectively. The output terminal of each AND circuit 86–89 is connected, respectively, to an input terminal of OR circuit 52 and the output terminal of each AND circuit 76–79 is connected, respectively, to an input terminal of OR circuit 51.

Output terminal 53 of OR circuit 51 is connected through a resistor to ground, to an input terminal of AND circuit 91, to a motor 92 for moving the right end of the object upward, and to an input terminal of an INVERTER 93 circuit. An output terminal of INVERTER circuit 93 is connected to an input terminal of an AND circuit 94 which has an output terminal connected to a motor 96 for moving the left end of the object upward.

Output terminal 54 of OR circuit 52 is connected through a resistor to ground, to an input terminal of an AND circuit 94, to a motor 97 for moving the right end of the object downward, and to an input terminal of an INVERTER circuit 98. An output terminal of INVERTER circuit 98 is connected to an input terminal of AND circuit 91 which has an output terminal connected to a motor 99 for moving the left end of the object downward.

*Operation of system*

Assume that the object to be leveled, for example the platform of a radar antenna, is level. In this condition bubble 13 of level sensor unit 10 is symmetrically located between bias electrode 16 and output electrodes 21, 22, 26, and 27. A "0" condition exists at each output electrodes 21, 22, 26, and 27 and is applied in parallel over leads 61, 62, 66, and 67 to INVERTER circuits 71, 72, 81, and 82, respectively, and to AND circuits 76, 77, 86, and 87, respectively. A "1" condition exists at each output electrode 23, 24, 28, and 29 and is applied in parallel over leads 63, 64, 68, and 69 to INVERTER circuits 73, 74, 83, and 84, respectively, and to AND circuits 78, 79, 88, and 89, respectively.

With level sensor unit in the level position as shown in FIG. 1, a "0" condition exists at the outputs of AND circuits 76–79 and 86–89; for example, a "0" condition is applied over lead 66 to one input of AND circuit 86 and a "1" condition is applied to the other input of AND circuit 86 from INVERTER circuit 71. Therefore, a "1" and "0" input to AND circuit 86 produces a "0" output. Another example, a "1" condition is applied over lead 69 to one input of AND circuit 89 and a "0" condition is applied to the other input of AND circuits 89 from INVERTER circuit 74. Therefore, a "1" and "0" input to AND circuit 89 produces a "0" output.

In like manner, a "0" condition exists at the outputs of all AND circuits 76–79 and 86–89 and is applied to all the inputs of OR circuits 51 and 52. As a result, a "0" condition exists at output terminals 53 and 54, respectively, of OR circuits 51 and 52. Therefore, the motor system, which includes motors 92, 96, 97, and 99, is not energized.

Next, assume that the object has deviated from the level plane and level sensor unit 10 has assumed the orientation shown in FIG. 3, that is, the left end of the unit is at a lower horizontal level than that of the right end. A "0" condition exists at terminals 21, 22, 23, and 26 and is applied in parallel over leads 61, 62, 63, and 66 to INVERTER circuits 71, 72, 73, and 81, respectively, and to AND circuits 76, 77, 78, and 86, respectively. A "1" condition exists at terminals 24, 27, 28, and 29 and is applied in parallel over leads 64, 67, 68, and 69 to the INVERTER circuits 74, 82, 83, and 84, respectively, and to AND circuits 79, 87, 88, and 89, respectively.

Under these conditions, a "0" condition exists at the output of AND circuits 76–79, 86, and 89, and a "1" condition exists at the output of AND circuits 87 and 88. A "0" condition exists at output terminal 53 of OR circuit 51 and is applied in parallel to AND circuit 91, to motor 92, and to INVERTER circuit 93 which produces and applies a "1" condition to AND circuit 94. A "1" condition is developed at output terminal 54 of OR circuit 52 and is applied in parallel to AND circuit 94, to motor 97, and to INVERTER circuit 98 which produces and applies a "0" condition to AND circuit 91.

AND circuit 91 has two "0" condition inputs, therefore, it produces and applies a "0" condition to motor 99. AND circuit 94 has two "1" condition inputs, therefore, it produces and applies a "1" condition to motor 96.

Motors 92 and 99 remain inoperative since a "0" condition is applied to these motors. Motors 96 and 97 are energized since a "1" condition is applied to these motors. These motors, 96, and 97, actuate facilities (not shown and not necessary to describe the invention) for leveling the object in a push-pull fashion, that is, motor 97 drives facilities to move the right end of the object down and motor 96 drives facilities to move the left end up until sensor unit 10 is level and the object is returned to the desired reference plane, thus energizing th motors 96 and 97.

The invention has been described utilizing a level sensor unit and leveling system for detecting the deviation of an object about a first axis, that is, an axis perpendicular to the plane of FIG. 1 and passing through center point 14, and for leveling the object in a single plane about that axis. It would be obvious to one skilled in the art that a second level sensor unit and leveling system of the kind described in this specification could be utilized for detecting the deviation of the object about a second axis perpendicular to the first axis and for leveling the object in a second plane about the second axis. This would, of course, accomplish maintaining of an object in two mutually perpendicular predetermined reference planes.

The invention has been described with respect to the leveling of a radar antenna platform. It will be understood that the system of the invention could be employed to maintain a wide variety of objects in any predetermined reference plane and that the circuitry employed in describing the system of this invention is illustrative of its principles and other embodiments may be devised without departing from the scope of the invention.

I claim:

1. In a system for maintaining an object in a predetermined reference plane,
    a level sensor unit, having a plurality of output electrodes, for sensing when the object deviates from the reference plane and for developing binary output voltages at its output electrodes indicative of the deviation,
    a pair of gate circuits coupled respectively to each output electrode of the level sensor unit and responsive to the binary voltages developed by the sensor unit for developing binary form output voltages indicative of the object movement necessary to restore the object to the reference plane, and
    means responsive to the binary form output voltages of the gate circuits for restoring the object to the reference plane.

2. In a system for sensing whether an object deviates from a predetermined reference plane and restoring the object to the reference plane,
    a level sensor unit, having a plurality of output electrodes, for detecting the deviation of the object from the reference plane and for developing binary voltages at the output electrodes indicative of the deviation,
    a plurality of AND circuits, each AND circuit having a first input connected respectively to an output electrode of the level sensor unit,
    a plurality of INVERTER circuits, each INVERTER circuit having its input connected respectively in parallel with the first input of an AND circuit to an output electrode of the level sensor unit and having its output connected respectively to a second input of a different AND circuit, and
    means responsive to voltages developed by the AND circuits in response to the binary voltages developed by the sensor unit for correcting the deviation of the object from the reference plane.

3. In a system for sensing the deviation of an object from a predetermined reference plane and restoring the object to the level plane,
    a first plurality of AND circuits,
    a second plurality of AND circuits,
    a level sensor unit, having a plurality of output electrodes, for sensing whether an object deviates from the reference plane and for developing binary voltages at its output electrodes representative of the deviation, each output electrode coupled respectively to a first input of an AND circuit of the first and second plurality of AND circuits,
    a first plurality of INVERTER circuits, each having an output coupled respectively to a second input of an AND circuit of the first plurality of AND circuits and having an input connected respectively in parallel with the first input of an AND circuit of the second plurality of AND circuits to an output electrode of the level sensor unit,
    a second plurality of INVERTER circuits, each having an output coupled respectively to a second input of an AND circuit of the second plurality of AND circuits and having an input connected respectively in parallel with the first input of an AND circuit of the first plurality of AND circuits to an output electrode of the level sensor unit,
    a pair of OR circuits, one OR circuit coupled to the outputs of the first plurality of AND circuits and the other OR circuit coupled to the outputs of the second plurality of AND circuits, responsive to the output voltages developed by the AND circuits in response to the binary voltages developed at the sensor unit for producing an output when the object deviates from the reference plane, and
    a motor system coupled to the outputs of the OR circuits and responsive to the OR circuits outputs for correcting the deviation of the object from the reference plane.

References Cited by the Examiner

UNITED STATES PATENTS 2,338,811    1/1944    Hasbrook.
2,846,635    8/1958    Shea _____ 318—489

FOREIGN PATENTS

Ad. 72,020    10/1959    France.

ORIS L. RADER, *Primary Examiner.*

JOHN F. COUCH, *Examiner.*

B. DOBECK, *Assistant Examiner.*